United States Patent [19]
Mamiya

[11] Patent Number: 5,209,510
[45] Date of Patent: May 11, 1993

[54] AIRBAG RESTRAINT SYSTEM FOR MOTOR VEHICLE

[75] Inventor: Kiyoshi Mamiya, Tokyo, Japan

[73] Assignee: Nissan Motor Co., Ltd., Yokohama, Japan

[21] Appl. No.: 738,374

[22] Filed: Jul. 31, 1991

[30] Foreign Application Priority Data

Jul. 31, 1990 [JP] Japan ..................... 2-203054
Aug. 9, 1990 [JP] Japan ..................... 2-210718

[51] Int. Cl.$^5$ ............................................. B60R 21/22
[52] U.S. Cl. ................................... 280/732; 280/735; 280/752
[58] Field of Search ............... 280/728, 730, 731, 732, 280/736, 740, 741, 742, 743, 752; 180/282

[56] References Cited

U.S. PATENT DOCUMENTS

| | | | |
|---|---|---|---|
| 3,632,136 | 1/1972 | Foltz | 280/732 |
| 3,741,580 | 6/1973 | Vos | 280/735 |
| 3,758,131 | 9/1973 | Stephenson et al. | 280/735 |
| 3,794,349 | 2/1974 | Fuller | 280/735 |
| 3,874,695 | 4/1975 | Abe et al. | 280/735 |
| 3,944,250 | 3/1976 | Wulf et al. | 280/732 |
| 3,966,224 | 6/1976 | Campbell et al. | 280/735 |
| 4,773,673 | 9/1988 | Sakurai | 280/732 |
| 5,074,583 | 12/1991 | Fujita | 280/732 |
| 5,081,587 | 1/1992 | Okano | 280/735 |

FOREIGN PATENT DOCUMENTS 58-23756 2/1983 Japan.

*Primary Examiner*—Karin L. Tyson
*Attorney, Agent, or Firm*—Pennie & Edmonds

[57] ABSTRACT

An airbag restraint system for protecting a vehicle passenger located aside a driver in an automotive vehicle. The airbag restraint system is comprised of an airbag unit disposed inside an instrument panel in a passenger compartment. The airbag unit includes an airbag which is normally stored in its folded state and inflates to project through an opening of the instrument panel into the passenger compartment. When a vehicle collision occurs at a high vehicle speed over 30 km/h, the airbag inflates largely with a high gas pressure thereby effectively absorbing a relatively large kinetic energy of the passenger's body being thrown forward. When the vehicle collision occurs at a low vehicle speed not higher than 30 km/h, the airbag inflates not so largely with a lower gas pressure, thereby preventing the passenger from being pushed back rearward of the vehicle at a high acceleration.

14 Claims, 7 Drawing Sheets

AIRBAG RESTRAINT SYSTEM FOR MOTOR VEHICLE

BACKGROUND OF THE INVENTION

1. Field of the Invention

This invention relates to improvements in an airbag restraint system, for protecting a passenger from impact during a vehicle collision, of the type in which an airbag is stored within an instrument panel of a motor vehicle.

2. Description of the Prior Art

A variety of airbag restraint systems have been proposed and put into practical use. Of these airbag restraint systems, the type having an airbag stored in its folded state inside an instrument panel is well known. In such a system, when a deceleration during a vehicle collision exceeds a predetermined level, an initiator is ignited to start the operation of an inflator, thereby inflating the airbag from its folded state. The inflated bag protects the vehicle passenger from coming into direct contact with the vehicle's instrument panel and/or front windshield. The airbag restraint system of this type is provided for a vehicle passenger situated on a seat beside a driver. For the driver, another type of an airbag restraint system is provided, in which an airbag is stored in its folded state in a center pad of a steering wheel.

An example of the airbag restraint system for the vehicle passenger is disclosed in Japanese Utility Model Provisional Publication No. 58-23756. Such a conventional airbag restraint system will be discussed with reference to FIG. 1 of the drawings of the present application. In FIG. 1, the airbag restraint system includes an airbag unit 1 assembled in a casing 2. The airbag unit i is fixedly disposed inside an instrument panel 3 and located facing an opening 3a of the instrument panel 3. A lid member 4 is disposed in a position to cover the opening 3a, and formed with low-strength portions 4a near the outer periphery thereof. The low-strength portions 4a are formed thin in thickness as compared with other portions of the lid member 4. An airbag 5 is stored in its folded state within the casing 2 together with an inflator 6. The inflator 6 is arranged to operate to supply a gas to the airbag when a vehicle collision occurs.

When a collision occurs having an impact such that a deceleration of the vehicle exceeds a predetermined level, a collision sensor outputs a signal representing such a high deceleration. In response to such a signal, an initiator disposed in the inflator 6 is ignited, which operates the inflator 6 which supplies the airbag with a high pressure gas. The airbag 5 then pushes the lid member 4, breaking the low-strength portions 4a, and rapidly inflates and develops into a space between the instrument panel 3 and a front windshield 7 in a manner as indicated in phantom M, thereby protecting the passenger on the seat beside the driver's seat from coming into direct contact with the windshield or the instrument panel 3.

However, difficulties have been encountered in the above-discussed conventional airbag restraint system, in which a considerable force pushing the passenger rearward acts from the inflating airbag 5 against the passenger when the vehicle speed immediately before the vehicle collision is lower, since the inflation of the airbag is accomplished only in response to a signal from a collision sensor.

More specifically, when the vehicle collides against an obstacle at a vehicle speed of 50 km/h or higher, a greater forward kinetic energy is developed in the passenger under the action of inertia, so that the kinetic energy is absorbed and dissipated by the inflated airbag 5 thereby softening an impact of the passenger against the instrument panel 3 and/or the front windshield 7. On the other hand, even when a vehicle collision occurs at a vehicle speed of 30 km/h or lower, the airbag 5 inflates in the same manner as when the vehicle encounters a collision at the highest vehicle speed even though the forward kinetic energy of the passenger is much smaller. As a result, the passenger's body during the power speed collision is unavoidably pushed back at a greater acceleration rearward of the vehicle, which is very dangerous for the passenger.

SUMMARY OF THE INVENTION

It is the prime object of the present invention to provide an improved airbag restraint system for a motor vehicle, which overcomes the above-described problems encountered in conventional airbag restraint system.

Another object of the present invention is to provide an improved airbag restraint system for a motor vehicle, which can converge the impact softening forces for a vehicle passenger to being within a certain narrow range even under a variety of vehicle collision speeds, thereby lessening the variation of the impact softening forces.

A further object of the present invention is to provide an improved airbag restraint system for a motor vehicle which can prevent an excessive backward force from being applied against a vehicle passenger from an inflating airbag, particularly at a low vehicle collision speed.

An airbag restraint system of the present invention is for a motor vehicle and comprises an instrument panel defining thereinside a space and formed with an opening through which the space is communicable with a passenger compartment. A lid is provided to substantially close the opening of the instrument panel. A collision sensor is provided to generate a collision signal when a collision occurs. An airbag unit is disposed in the space inside the instrument panel and includes a plurality of inflators capable of being operated to generate high pressure gas in response to the collision signal, and an airbag store in its folded state and inflatable to project into the passenger compartment through the lid. Additionally, a control device is provided to cause the airbag to inflate in a first inflating mode in response to the collision signal at a first vehicle speed higher than a predetermined level, and in a second inflating mode in response to the collision signal at a second vehicle speed lower than the predetermined level. The second inflating mode provides a force of the inflating airbag for pushing back a passenger smaller than that provided by the first inflating mode.

With this arrangement, when the vehicle collides with an obstacle at the vehicle speed higher than the predetermined level, the airbag rapidly inflates developing a larger force for pushing the passenger backward. As a result, the kinetic energy of the passenger's body being thrown forward is absorbed and dissipated successfully by the inflated airbag thus softening the impact of the passenger against the instrument panel and/or a front windshield. When the collision occurs at the vehicle speed lower than the predetermined level, the airbag inflates and projects into the passenger compartment but generates a smaller force for pushing back the passenger, thereby preventing an excessive force from being applied by the airbag to the passenger. This would result if the force was the same as that for a high speed collision. This protects the passenger from being pushed back rearward into the vehicle at a high acceleration.

BRIEF DESCRIPTION OF THE DRAWINGS

In the drawings, like reference numerals designate like parts and elements throughout all the figures, in which.

DETAILED DESCRIPTION OF THE INVENTION

Figure 1:
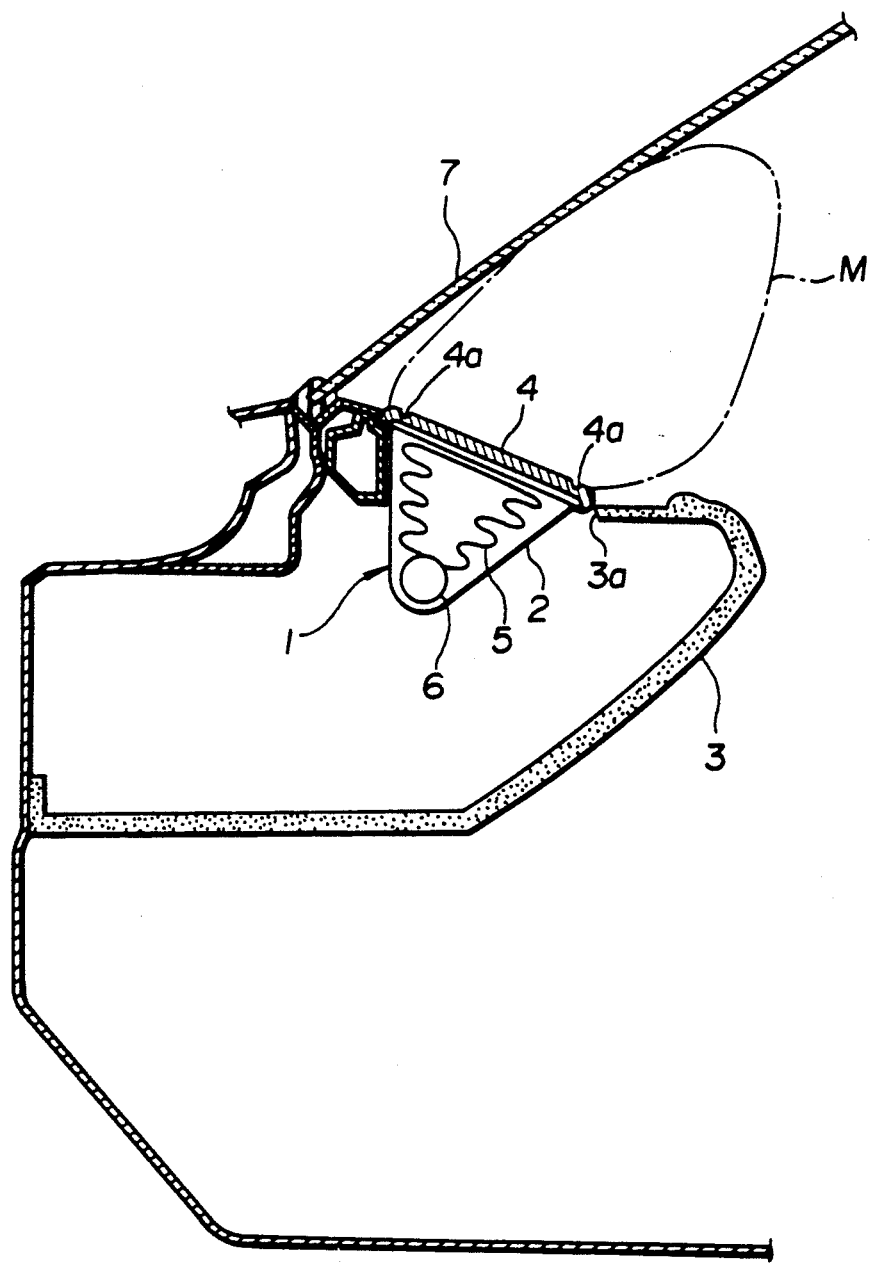
FIG. 1 is a schematic cross-sectional view of a conventional airbag restraint system.
Figure 2:
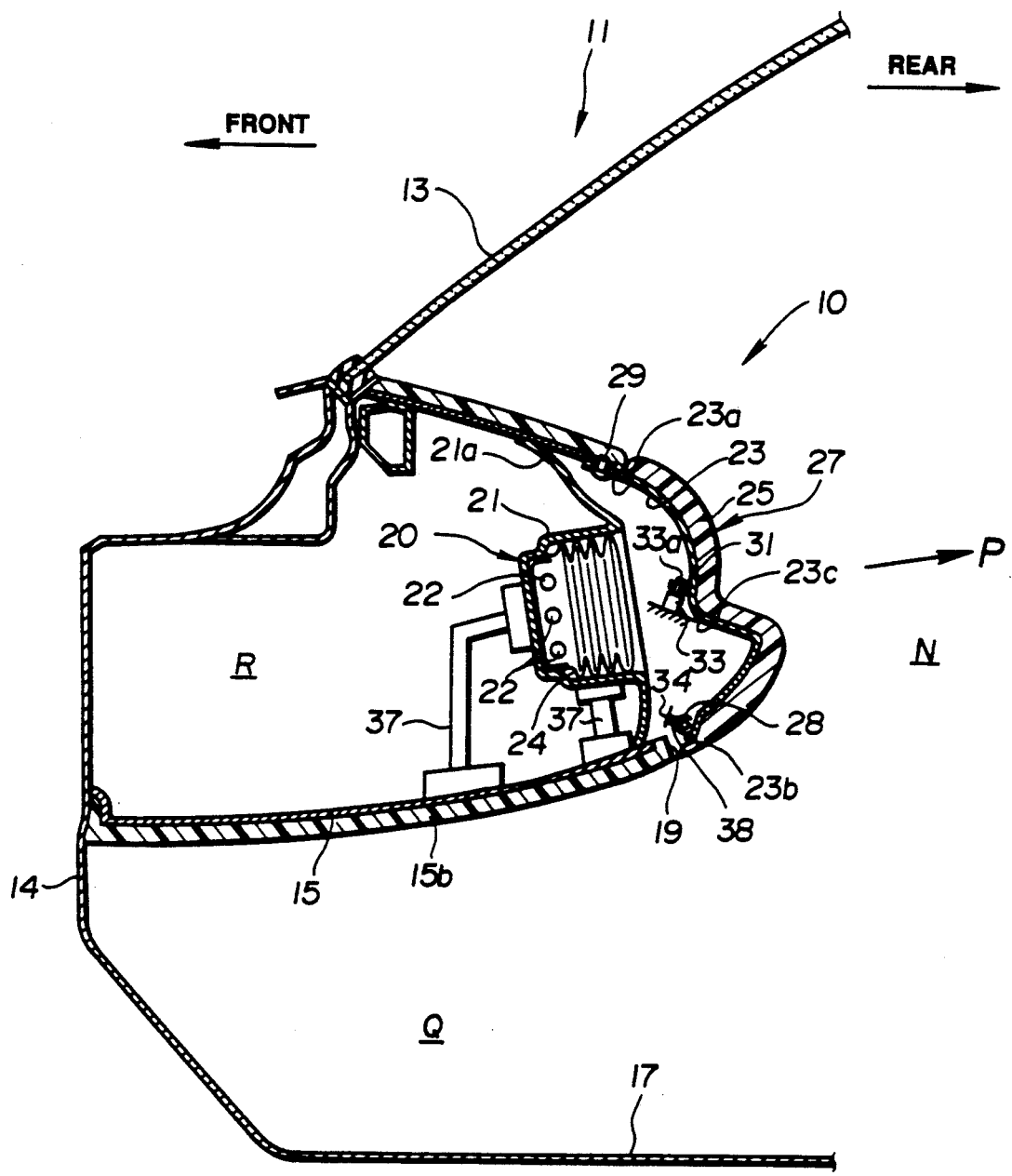
FIG. 2 is a schematic cross-sectional view of an embodiment of an airbag restraint system in accordance with the present invention.

Referring now to FIG. 2, an embodiment of an airbag restraint system according to the present invention is illustrated by the reference numeral 10. The airbag restraint system 10 is, in this embodiment, for a vehicle passenger (not shown) seated on a front seat beside a driver's seat (now shown) in an automotive vehicle 11. The vehicle 11 has a passenger compartment N defined by a portion wall 14 located at the front side of the passenger compartment N in a longitudinal direction of the vehicle. The partition wall 14 separates the passenger compartment N from an engine compartment (not shown) in which a power plant, (now shown) which could be an internal combustion engine, is disposed. The partition wall 14 is formed integral with a floor member 17. A front windshield or window glass 13 is disposed to be connected with the upper part of the portion wall 14.

An instrument panel 15 is formed projected from the partition wall 14 rearwardly into the passenger compartment N. The instrument panel 15 is generally C-shaped in cross-section as shown in FIG. 2 and extends laterally or in the direction of width of the vehicle 11 to define thereinside a space R. A pad material 15b is formed on the outer surface of the instrumental panel 15. A space Q is formed between the lower part of the instrument panel 15 and the floor member 17, so that a glove box and the like are disposed in the space Q. The instrument panel 15 is formed with an opening 19 facing an obliquely upward and rearward direction indicated by an arrow P. An airbag unit 21 is fixedly disposed inside the instrument panel 15 or in the space R.

The airbag unit 20 includes a generally cup-shaped casing 21 opened in the direction P. In other words, the axis of the casing 21 is generally aligned with the direction P. The thus directed casing 21 is fixedly supported in the space R inside the instrument panel 15 by means of suitable supporting members 37 as shown in FIG. 2. It will be understood that the supporting members 37 are only examples as the supports may be of other types than those shown in FIG. 2. In this embodiment, the casing 21 is formed at its peripheral portion to define an opening with an integral flange section 21a fixed to suitable portions of the instrument panel 15. A plurality of inflators 22 are disposed in the casing 21 and arranged to generate gas to be supplied to an airbag 24. The airbag 24 is disposed in its folded state in the casing 21 as shown in FIG. 2.

A lid 27 is disposed to cover or fill the opening 19, and includes a base sheet member 23 which is soft and bendable and made of aluminum. The base sheet member 23 is covered at its outer surface (on the side of the passenger compartment N) with a pad member 25. The upper end section 23a of the base sheet member 23 is fixedly secured to the instrument panel 15 at a portion near the opening 19 by means of a clip 29. Additionally, the lower end section 23b of the base sheet member 23 is provided with a pin 28 which projects in the space R defined by the instrument panel 15. The pin 28 is detachably fitted to a fastener 38 which is fixed to a stationary member 34 on a vehicle body side.

The base sheet member 23 is formed, at a central part, in the vertical direction, with a bent portion 23c having a L-shaped cross-section as shown in FIG. 2, with the bent portion 23c extending in the direction of the width of the vehicle. A striker 31 formed with a lock hole 31a is projected from the inner surface (on the side of the space R) of the base sheet member 23 at a location near the corner of the bent portion 23c. The striker 31 is fixed to the base sheet member 23 and extends in the space R as clearly shown in FIG. 3.

Figure 3:
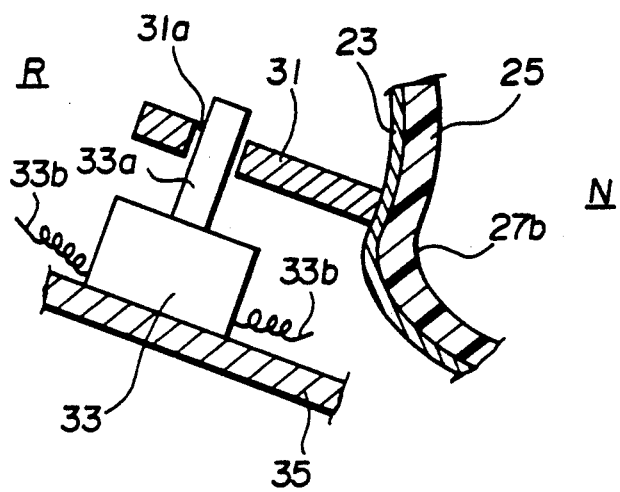
FIG. 3 is an enlarged sectional view of an essential part of the airbag restraint system of FIG. 2.

As shown in FIG. 3 an actuator 33 having a solenoid (not shown) is fixed to a stationary plate 35 fixedly supported to the instrument panel 15. The actuator 33 has an operating rod 33a which is selectively projected into the lock hole 31a of the striker 31 as shown in FIG. 3. More specifically, the operating rod 33a is projected to engage with the lock hole 31a as shown in FIG. 3 when the solenoid is energized or turned ON upon being supplied with electric current through lead wires 33b. The operating rod 33a is withdrawn to disengage with the lock hole 31a when the solenoid is deenergized or turned OFF by removing the supply of electric current through the lead wires 33b. The actuator 33 and the striker 31 constitute an electrical lock mechanism for the lid 27.

Figure 4:
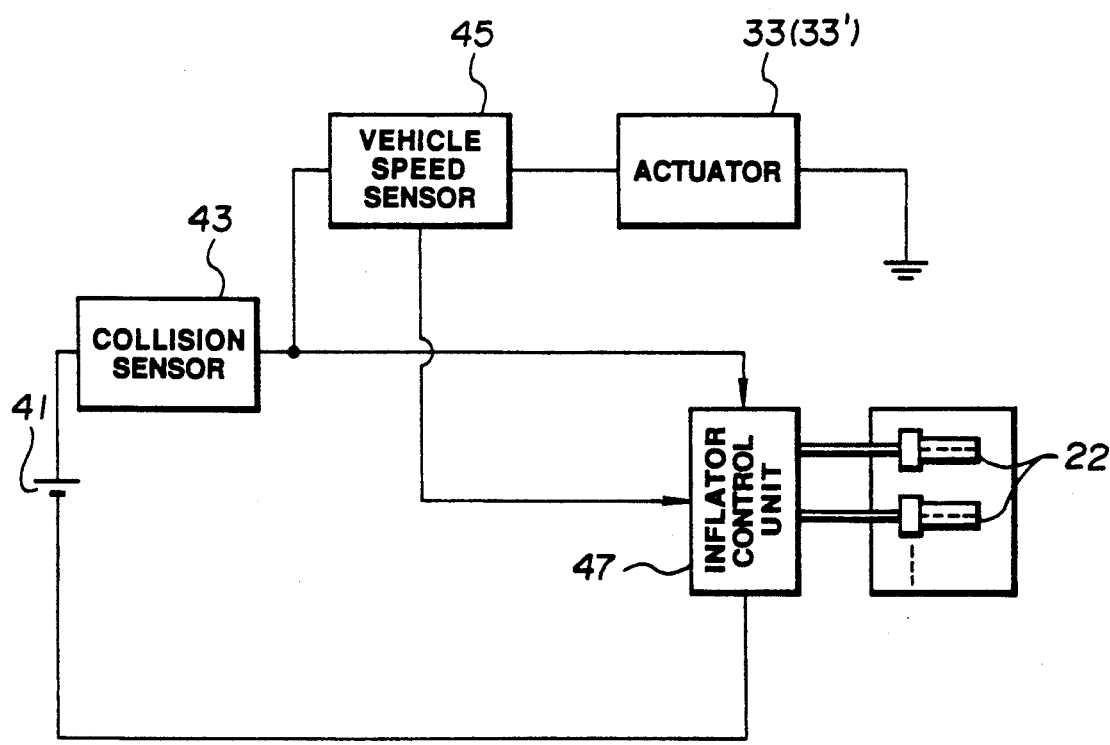
FIG. 4 is a circuit diagram of an electric circuit for controlling an actuator and inflators used in the airbag system of FIG. 2.

The inflators 22 are arranged to be operated to generate gas under the action of an electric circuit shown in FIG. 4. The circuit includes a collision sensor 43 electrically connected with an electric source such as a battery. The collision sensor 43 is electrically connected with a vehicle speed sensor 45 which is in turn electrically connected with the actuator 33. The collision sensor 43 and the vehicle speed sensor 43 are electrically connected with an inflator control unit 47 so that the operation of the inflators 22 is controlled in response to the signals output from the collision sensor 43 and the vehicle speed sensor 45. Additionally, the solenoid of the actuator 33 is deenergized in response to a signal representing a vehicle speed over a predetermined level (for example, 30 km/h), from the vehicle speed sensor 45. The solenoid of the actuator 33 is energized in response to a signal representing a vehicle speed not higher than the predetermined level.

The manner of operation of the airbag restraint system will be discussed hereinafter also with reference to FIGS. 5 and 6.

The operation will be described first for the high speed case where it collides with an obstacle at a vehicle speed over the predetermined level, such as 30 km/h. This collision is detected by the collision sensor 43 thereby outputting a collision signal indicating occurrence of the collision. The collision signal is input to the inflator control unit 47 simultaneously with an input of the signal indicating the vehicle speed, sent from the vehicle speed sensor 45. At this time, the actuator 33 is also supplied with the signal from the vehicle speed sensor 45, and therefore the solenoid of the actuator 33 is deenergized so that the operating rod 33a of the actuator 33 is pulled out of the lock hole 31a of the striker 31. Then, in response to the signals from the collision sensor 43 and the vehicle speed sensor 45, the inflator control unit 47 outputs a signal commanding ignition of all the initiators (not shown) for the respective inflators 22. One initiator is disposed in each inflator 22. Consequently, all the inflators 22 are simultaneously operated to generate high pressure gas, so that the airbag 24 starts a rapid inflation and development within a very short time.

Figure 5:
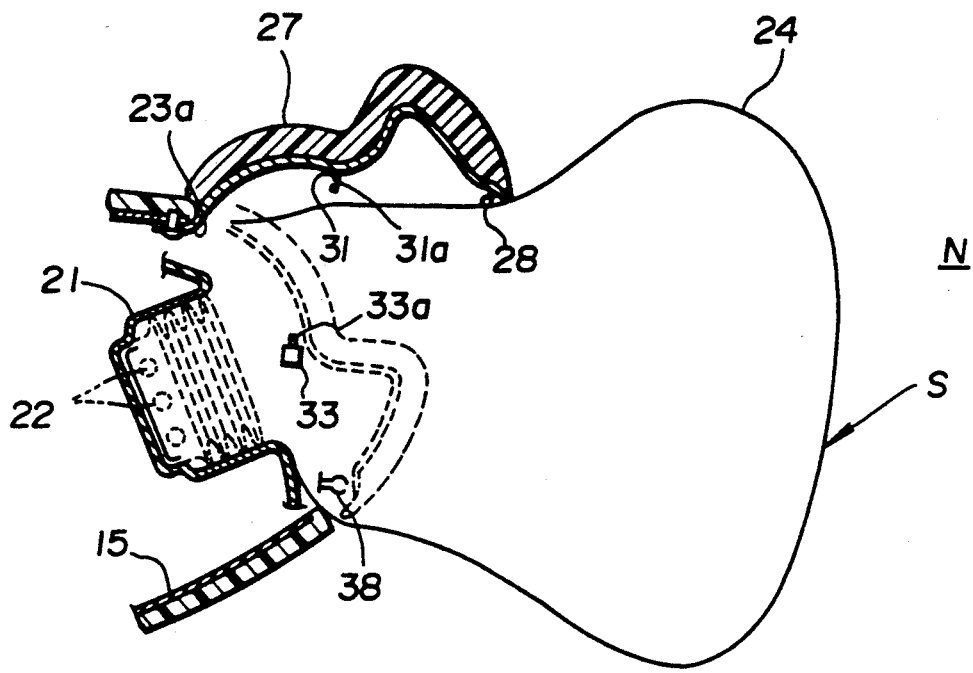
FIG. 5 is a schematic sectional view showing an operating mode of the airbag restraint system, in which the airbag inflates to fully open a lid.
Figure 6:
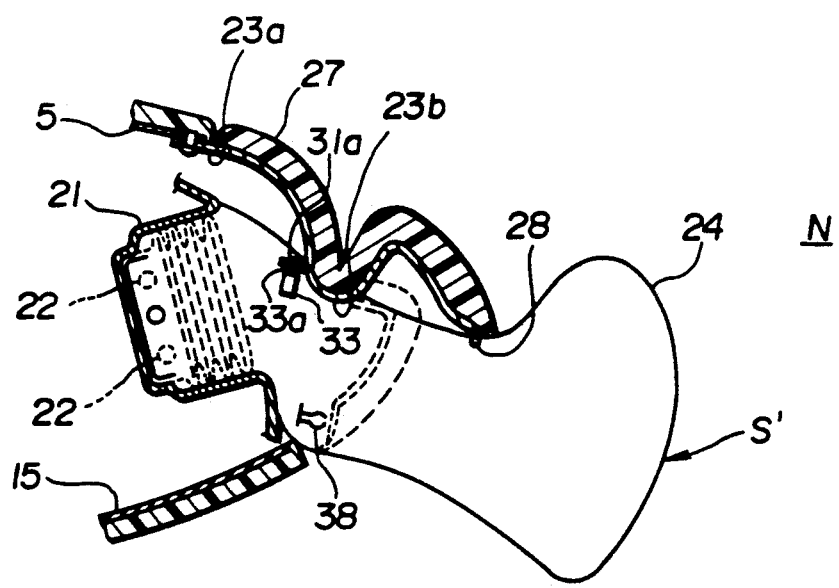
FIG. 6 is a schematic sectional view similar to FIG. 5 but showing another operating mode of the airbag restraint system, in which the airbag inflates to partly open the lid.

Then, the pin 28 at the lower end section 23b of the lid base sheet member 23 gets out of the fastener 38 under the expansion force of the airbag 24, so that the lid 27 jumps up in which the upper end section 23a of the lid base sheet member 23 is bent, as shown in FIG. 5. Accordingly, the lid 27 is fully opened so that the airbag 24 rapidly inflates and develops into the passenger compartment N, as indicated by the character S. As a result, the kinetic energy of the passenger's body being thrown forward is absorbed and dissipated successfully by the inflated airbag 24, thereby effectively softening the impact of the passenger against the instrument panel 15 and/or the front windshield 13.

The operator will next be described for the low speed case which collides with an obstacle at a vehicle speed less than or equivalent to 30 km/h. This collision is detected by the collision sensor 43 thereby to output a collision signal. Then, the collision signal is input to the inflator control unit 47 simultaneously with an input of the signal representing the vehicle speed, from the vehicle speed sensor 45. The vehicle speed signal is also output to the actuator 33. In response to the vehicle speed signal, the solenoid of the actuator 33 is energized, and therefore the operating rod 33a is maintained to be inserted into or engaged with the lock hole 31 of the striker 31.

At this time, in response to the signals from the collision sensor 43 and the vehicle speed sensor 45, the inflator control unit 47 outputs a signal for commanding ignition of initiators of a predetermined subset of the inflators 22. Then, the airbag is supplied with high pressure gas from the inflators 22 so that the pin 28 at the lower end section 23b of the lid base sheet member 23 gets out of the fastener 38. However, since the operating rod 33a is maintained to be engaged with the lock hole 31a, the lid 27 is bent at the bent portion 23c of the bendable base sheet member 23 under the expansion force of the airbag 24, so that the lower-half part of the lid 27 is jumped up thereby to put the lid 27 into its generally half-opened state as shown in FIG. 6. As a result, the airbag 24 is rapidly inflated and developed into the passenger compartment N as indicated by the character S' in FIG. 6, thus softening impact of the passenger against the instrument panel 15 and/or the front windshield 13.

It is to be noted that the degree of the inflation of the airbag 24 into the passenger compartment N at this time is small as compared with that during the collision at the vehicle speed over 30 km/h as shown in FIG. 5, so that a force against the kinetic energy of the passenger's body being thrown forward (i.e., a degree of softening impact during the collision) is smaller during the collision at the vehicle speed less than 30 km/h. Thus, the passenger's body can be effectively prevented from being pushed back rearward into the vehicle at a high acceleration under the action of a larger inflation force of the airbag 24.

Figure 7:
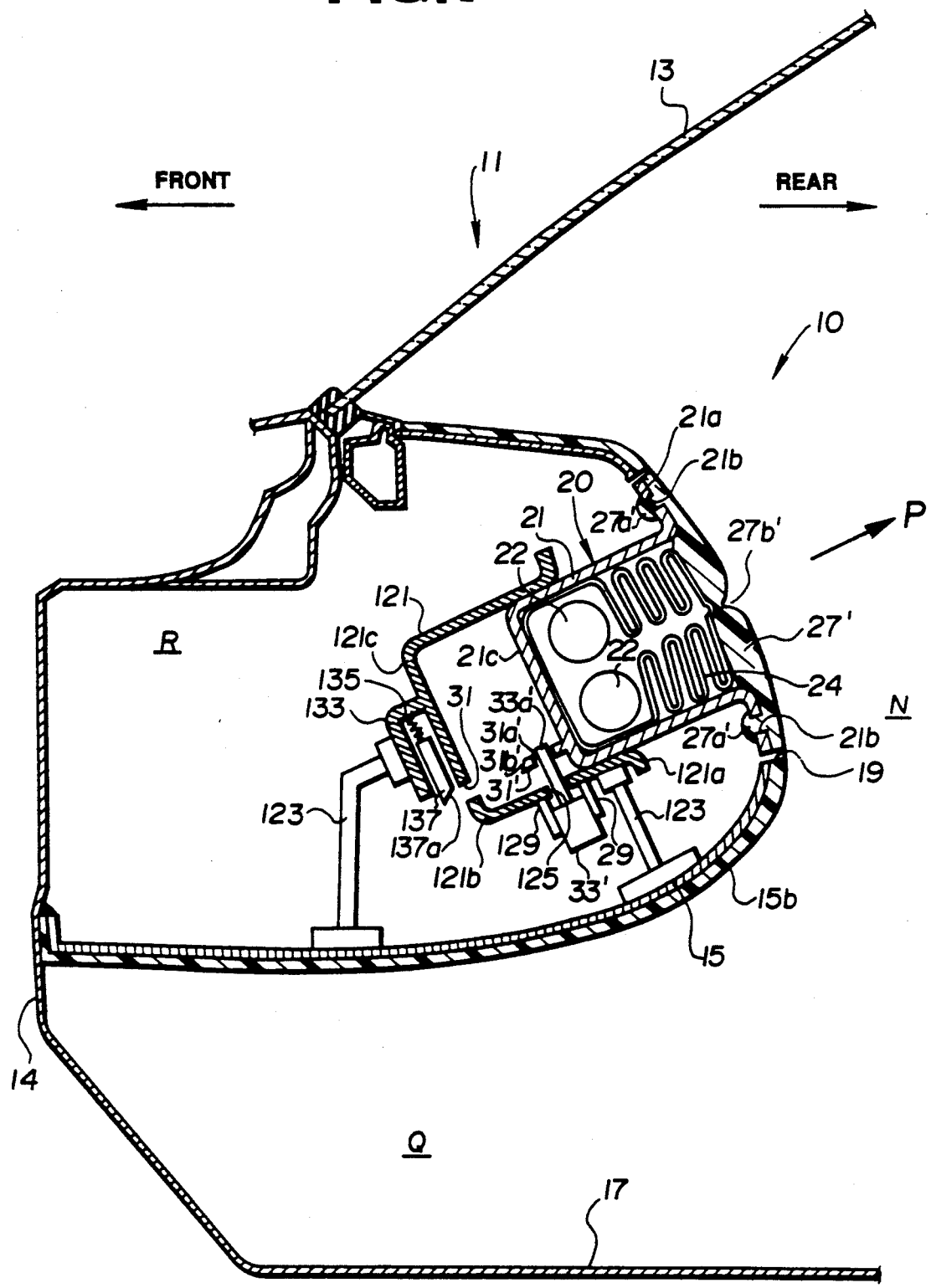
FIG. 7 is a schematic cross-sectional view of another embodiment of the airbag restraint system in accordance with the present invention.

FIG. 7 illustrates another embodiment of the airbag restraint system according to the present invention, which is smaller to the above-discussed embodiment. In this embodiment, the airbag unit 20 and a support housing 121 for slideably supporting the airbag unit 20 are disposed inside the instrument panel 15 or within the space R. The airbag unit 20 is movable in the obliquely upward and rearward direction P in the space R under the action of the support housing 121.

The lid 27' in this embodiment is formed generally flat and made of a pad or resilient material. the lid 27' is integrally formed with a plurality of clip portions 27a' each of which is of the shape of a projection with an enlarged head as shown in FIG. 7. The clip portions 27a' are fitted respectively in a plurality of through-holes 21b formed in the flange sections 21a of the generally cup-shaped casing 21 of the airbag unit 20. Accordingly, the lid 27' is fixedly secured to the flange sections 21 of the airbag unit casing 21. It is to be noted that the lid 27' is formed at its central part with a low strength portion 27b' which is smaller in thickness than other portions of the lid 27'. The low strength portion 27b' extends in the direction of width o the vehicle.

The airbag unit casing 21 has a striker 31' which is formed at a predetermined position of the bottom wall 21c and projects in an obliquely downward and rearward direction. The striker 31' is formed at its central section with the lock hole 31a' and at its free end with an inclined surface 31b'. The support housing 121 is generally cup-shaped so that the casing 21 of the airbag unit 20 is slideably fitted in the support housing 121. More specifically, the outer peripheral surface of the cylindrical wall 21c of the airbag unit casing 21 is in slidable contact with the inner peripheral surface of the cylindrical wall 121b of the support housing 121. As shown in FIG. 7, the bottom section of the airbag unit casing 21 is fitted or inserted in the support housing 121 in such a manner that a predetermined distance is provided between the casing bottom wall 21c and a surface at which the support housing 121 opens to define an opening 121a. The support housing 121 is fixedly supported to the inner surface of the instrument panel 15 by means of suitable supporting members 123. It will be understood that the supporting members 123 may be replaced with those of other types than shown in FIG. 7. In the thus supported state, the support housing 121 is maintained in a posture in which the axis thereof is aligned with the direction P and with the axis of the airbag unit casing 21.

The support housing 121 is formed at its cylindrical wall 121b with a first through-hole 125. disposed outside the cylindrical wall 121b is the actuator 33 which is similar in structure and arrangement to that shown in FIG. 3. The actuator 33 is fixed to the cylindrical wall 121b by means of support plates 129, 129. In this embodiment, the operating rod 33a' of the actuator 33' extends inside the support housing 121 through the first through-hole 125. The operating rod 33a' is inserted or engaged in the lock hole 31a' of the striker 31' under a condition as shown in FIG. 7 in which the airbag unit casting 21 partly enters the support housing 121. The actuator 33' and the striker 31' constitute the electric lock mechanism for locking the airbag unit 20 at a first or rear predetermined position.

The support housing 121 is further formed at its bottom wall 121c with a second through-hole 131 which is formed at a position on the extension of the striker 31'. Additionally, a cylindrical guide member 133 is disposed on the outer surface of the bottom wall 121c of the support housing 121 at a position near the second through-hole 131. A lock pin 137 is slideably disposed inside the guide member 133 and biased downwardly by a spring 135. The lock pin 137 is formed at its free end with an inclined surface 137a which is slideably contactable with the inclined surface 31b' of the striker 31'. The inclined surface 137a is positioned immediately outside or forward of the second through-hole 131. The lock pin 137 and the spring 135 constitute a mechanical lock mechanism for locking the airbag unit 20 at a second or front predetermined position.

In this embodiment, the inflators 22 are arranged to be operated to generate high pressure gas under the action of the electric circuit shown in FIG. 4, so that the manner of operation of the inflators 22 is the same as that in the embodiment of FIG. 2. Additionally, as shown in the electric circuit of FIG. 4, the actuator 33' is electrically connected with the vehicle speed sensor 45 and therefore controlled in response to the vehicle speed signal from the vehicle speed sensor 45 in a similar manner as that in the embodiment of FIG. 2. However, in this embodiment, the actuator 33' is arranged as follows: The operating rod 33a' is projected to be engaged or inserted into the lock hole 31a' as shown in FIG. 7 when the solenoid of the actuator 33' is energized upon being supplied with electric current in response to the signal indicative of the vehicle speed being over the predetermined level, from the vehicle speed sensor 45. On the other hand, the operating rod 33a' is withdrawn or disengaged from the lock hole 31a' when the solenoid is deenergized by cutting off the supply of electric current in response to the signal indicative of the vehicle speed being lower than the predetermined level.

In the operation of the embodiment of FIG. 7, assuming that the vehicle collides with an obstacle at a vehicle speed over the predetermined level, such as 30 km/h, the collision sensor 43 outputs the collision signal when indicating that a collision has occurred. The collision signal is input to the inflator control unit 47 simultaneously with an input of the signal representative of the vehicle speed from the vehicle speed sensor 45. At this time, the actuator 33' is also supplied with the signal from vehicle speed sensor 45, and therefore the solenoid of the actuator 33' is energized so that the operating rod 33a' is maintained to be engaged in the lock hole 31a' of the striker 31'. Then, in response to the signals from the collision sensor 43 and the vehicle speed sensor 45, the inflator control unit 47 outputs a signal commanding ignition of all of the initiators (not shown) for the respective inflators 22. One initiator is disposed in each inflator 22. Consequently, all the inflators 22 are simultaneously operated to generate high pressure gas, so that the airbag 24 starts its rapid inflation and development into the passenger compartment N as indicated in phantom S in FIG. 8, breaking the low strength portion 27b' of the lid 27'. As a result, the kinetic energy of the passenger's body being thrown forward is absorbed by the inflated airbag 24, thereby effectively softening the impact of the passenger against the instrument panel and/or the front windshield 13.

Next, the operation will be described for the case where the vehicle collides with an obstacle at a vehicle speed less than 30 km/h. First, the collision sensor 43 outputs the collision signal. Then, the collision signal is input to the inflator control unit 47 simultaneously with input of the signal representative of the vehicle speed from the vehicle speed sensor 45. The vehicle speed signal is also input to the actuator 33'. In response to the vehicle speed signal, the solenoid of the actuator 33'. In response to the vehicle speed signal, the solenoid of the actuator 33' is deenergized causing the operating rod 33a to be withdrawn or disengaged from the lock hole 31a' of the striker 31'. Accordingly, the airbag until 20 is put into its condition to be slidable along the cylindrical wall 121b of the support housing 121 and in the obliquely downward and forward direction.

Figure 9:
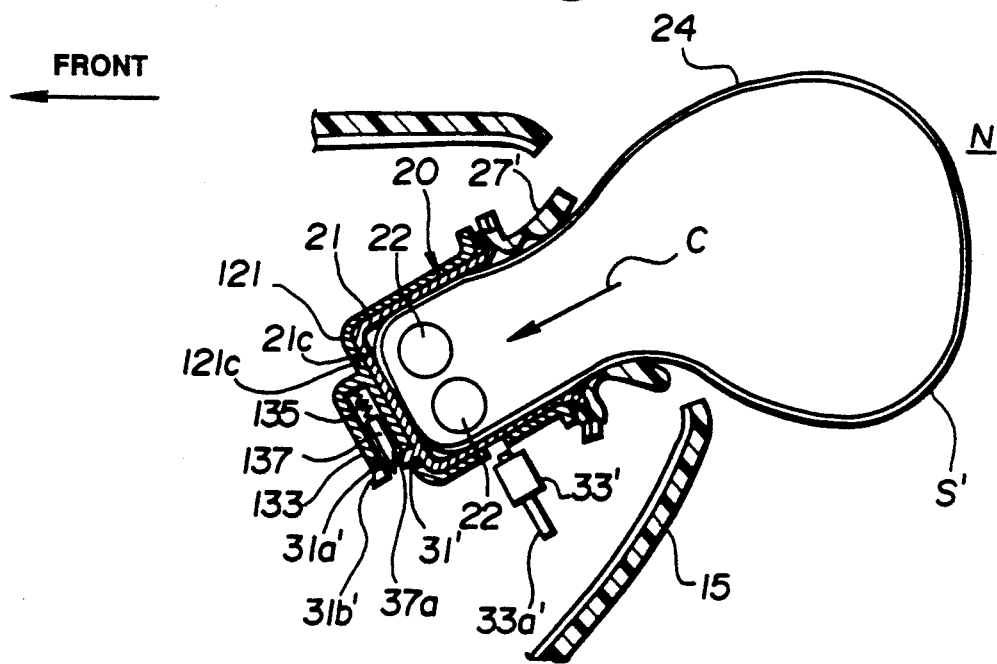
FIG. 9 is a schematic sectional view similar to FIG. 8 but showing another operating mode of the airbag restraint system of FIG. 7, in which the airbag inflates to a smaller size with a smaller inflating force.

At this time, in response to the signals from the collision sensor 43 and the vehicle speed sensor 45, the inflator control until 47 outputs the signal for commanding ignition of initiators a predetermined subset of the inflators 22. The airbag 24 is then supplied with high pressure gas form the inflators 22, so that a reaction force is applied to the airbag unit 20 in the direction of an arrow C shown in FIG. 9. The airbag unit 20 slidingly moves obliquely downward and forward along the cylindrical wall 121b of the support housing 121 and brought into its condition in which the bottom wall 21c of the airbag unit casing 21 comes into contact with or close to the bottom wall 121c of the support housing 121 as shown in FIG. 9. Accordingly, the striker 31' projects through the second hole 131 of the bottom wall 121c of the support housing 121, so that the inclined surface 31b' of the striker 31' is brought into contact with the inclined surface 137a of the lock pin 137 thereby pushing up the rock pin 137 along the guide member 133 against the bias of the spring 135. Then, the tip end of the striker 31' moves forward over the lock pin 137 so that the lock pin 137 comes into engagement with or inserted into the lock hole 31'a of the striker 31' under the bias of the spring 135. Consequently, the airbag unit 20 is locked at a position as shown in FIG. 9 in which the bottom walls 2c, 121c of the airbag unit casing 21 and the support housing 121 are contacted with each other.

Figure 8:
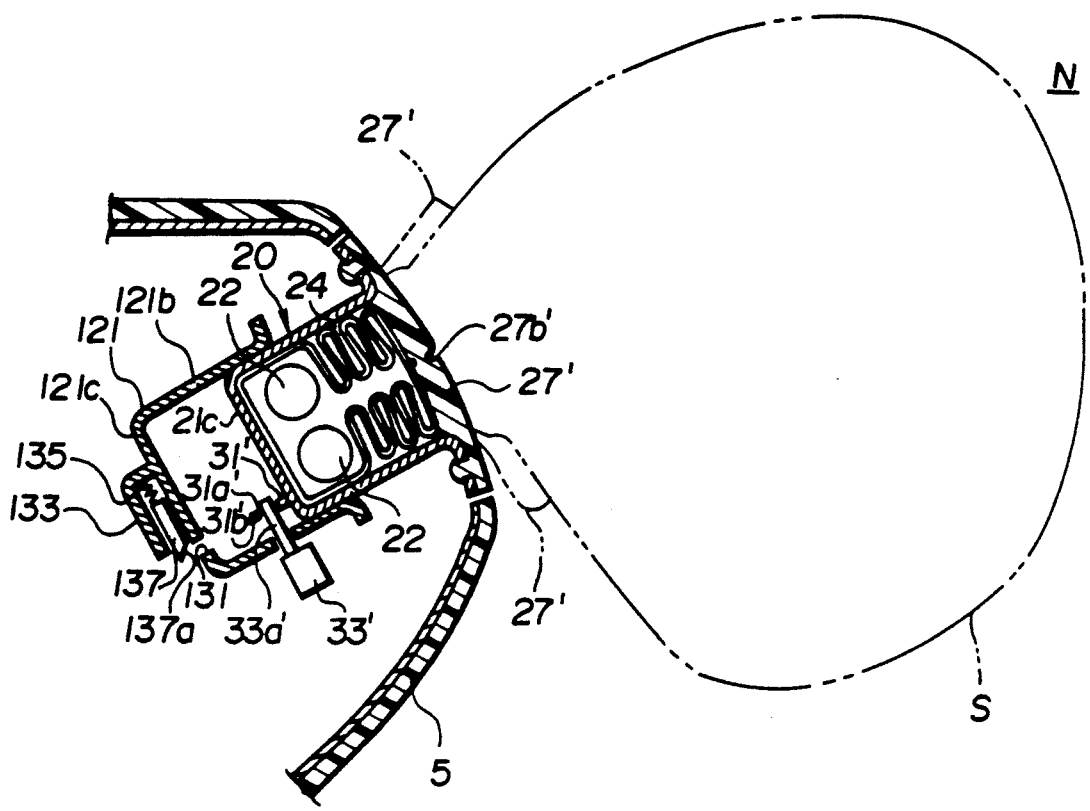
FIG. 8 is a schematic sectional view showing an operating mode of the airbag restraint system of FIG. 7, in which an airbag inflates largely with a larger inflating force.

Then, inflation of the airbag 24 into the passenger compartment N is accomplished as indicated by the character S' in FIG. 9 which is suppressed as compared with that indicated by the character S in FIG. 8. Under such inflation condition of the airbag 24 and the effect of moving the airbag unit 20 into the support housing 121, a force against the kinetic energy of the passenger's body being thrown forward (i.e., a degree of softening impact during the collision) is smaller during the collision at the vehicle speed not higher than 30 km/h. Thus, the passenger's body can be effectively prevented from being pushed back rearward into the vehicle at a high acceleration under the action of a larger inflation force of the airbag 24.

Figure 10:
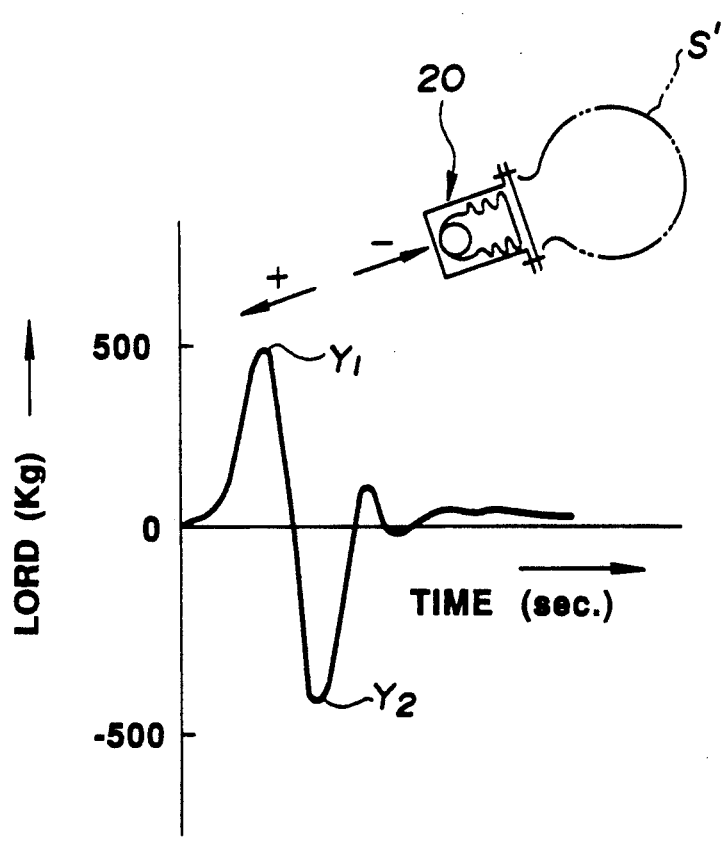
FIG. 10 is a graph showing a variation in load to be applied to an airbag unit of the airbag restraint system of FIG. 7 during operation of the system, in terms of lapsed time.

FIG. 10 shows a change in load applied to the airbag unit 2 in terms of lapsed time during the inflation of the airbag 24 as indicated by the character S' in FIG. 9. This change was experimentally measured. As shown in FIG. 10, at the initial stage of inflation of the airbag 24, the airbag unit 20 receives a compression load of about 500 kg in the plus (+) direction as indicated with a upward peak $Y_1$. In accordance with lapse of time, the airbag unit 20 receives a tension load in the minus (−) direction as indicated with a downward peak $Y_2$.

Under the action of the compression load ($Y_1$), the airbag unit 20 is pushed into the support housing 121. The airbag unit 20, once in the support housing, is thus prevented from flying out of the support housing 121 in the direction of the passenger compartment N even if it receives the tension force ($Y_2$) at the next stage, under the locking action of the lock pin 137.

What is claimed is:

1. An airbag restraint system for a motor vehicle, comprising:
    an instrument panel defining a recess space and formed with an opening through which said space is communicable with a passenger compartment;
    a lid by which said opening is substantially closeable;
    means for detecting a speed of the vehicle and outputting a vehicle speed signal representative of the detected speed;
    a collision sensor for generating a collision signal when a collision of the vehicle occurs;
    an airbag unit disposed in said space inside said instrument panel, said airbag unit including a plurality of inflators for generating a high pressure gas in response to the collision signal, and an airbag stored in its folded state and inflatable to be projectable into the passenger compartment through said lid; and
    means for causing said airbag to inflate in a first inflating pressure, a first primary direction of inflation, and a first inflation contour in response to a concurrence of the collision signal and the vehicle speed signal being higher than a predetermined level, and in a second inflating pressure, a second primary direction of inflation, and a second inflation contour in response to a concurrence of the collision signal and the vehicle speed signal being lower than said predetermined level,
    said causing means including a means for operating all of said inflators in response to a concurrence of the collision signal and the vehicle speed signal being higher than the predetermined level, and a predetermined subset from among said inflators in response to a concurrence of the collision signal and the vehicle speed signal being lower than the predetermined level; and
    means for selectively interfering with a portion of the airbag so as to control the airbag to inflate in the first primary direction of inflation and the first contour of inflation in response to the collision signal when the vehicle speed signal is higher than the predetermined level and in the second primary direction of inflation and the second contour of inflation in response to the collision signal when the vehicle speed signal is lower than the predetermined level.

2. An airbag restrain system as claimed in claim 1, wherein said predetermined level in vehicle speed is within a range from about 30 to about 50 km/h.

3. An airbag restraint system as claimed in claim 1, wherein said lid has a first end section securely attached to said instrument panel at a peripheral portion defining the opening, and a second end section detachably connected to said instrument panel at another peripheral portion defining the opening, said lid being made of a bendable material and having an flexible hinge means portion located at a generally central part between said first and second end sections.

4. An airbag restrain system according to claim 3, wherein said detachable means has means for releasing said another peripheral portion of said lid from the instrument panel in response to the collision signal, and said selective interfering means of said causing means includes a securing means for securing a predetermined portion of said lid to the instrument panel, said predetermined portion being proximate to said flexible hinge means, in response to a concurrence of the collision signal and the vehicle speed signal being lower than the predetermined value, and for releasing said predetermined portion of said lid from the instrument panel in response to a concurrence of the collision signal and the vehicle speed signal being greater than the predetermined value.

5. An airbag restraint system according to claim 4, said selective interfering means of said causing means further comprising means for fully opening said lid upon said lid receiving a force developed by said airbag which is inflating, when said securing means releases the predetermined portion of said lid.

6. An airbag restrain system according to claim 4, said selective interfering means of said causing means further comprising means for opening said first section of the lid, by pivoting at said flexible hinge means, in response to said first section receiving a force developed by said airbag when inflating, when said securing means secures the predetermined portion of the lid to the instrument panel.

7. An airbag restraint system as claimed in claim 1, wherein said airbag unit includes a generally cup-shaped casing having an open end facing said lid, said casing being fixedly supported to said instrument panel, and said airbag and said inflators being disposed in said casing.

8. An airbag restraint system according to claim 4, wherein said securing means includes a latch member defining a lock hole, said latch member being fixedly secured to said lid at said predetermined portion, and includes an actuator means for engaging an operating rod with said lock hole thereby securing said predetermined portion to the instrument panel in response to a concurrence of the collision signal and the vehicle speed signal being lower than the predetermined value, and for disengaging said operating rod from said lock hole in response to a concurrence of the collision signal and the vehicle speed signal being higher than the predetermined value.

9. An airbag restraint system according to claim 1, wherein said lid is formed with a low strength portion which is readily breakable upon receiving a force developed under inflation of the airbag, and wherein said selective interfering means of said causing means includes a support housing in which said airbag unit is slideably movably disposed, said support housing being fixedly disposed in said space inside said instrument panel, said airbag unit being arranged to move forward within the support housing, from an initial position before inflation, under a reaction force of said airbag when inflating, and
- a first fixing means for fixing said airbag unit from moving beyond a first position relative to said support housing, said fixing being in response to a concurrence of the collision signal and the vehicle speed signal being higher than the predetermined value, and
- a release means for releasing said airbag unit to move, under said reaction force, forward of said first position in response to a concurrence of the collision signal and the vehicle speed signal being lower than the predetermined value, wherein
- said first position is located so that an airbag inflation when said airbag unit is at said first position extends from the instrument panel with said first contour of inflation.

10. An airbag restraint system according to claim 9, further comprising a second fixing means for fixing said airbag at a second position within said support housing when said release means releases said airbag unit to move forward of said first position under the inflation reaction, said second position being forward relative to said first position, wherein
- said second position is located so that an airbag inflation when said airbag unit is at said second position has an interference with a portion of said lid and extends from the instrument panel with said second contour of inflation.

11. An airbag restraint system according to claim 10, wherein said first fixing means includes a latch member, fixedly secured to said airbag unit, and formed to define a lock hole, and includes an actuator means for engaging an operating rod with said lock hole to fix said airbag unit at the first position in response to a concurrence of the collision signal and vehicle speed signal being higher than the predetermined value, and for disengaging said operating rod from the lock hole to allow said airbag unit to move to the second position, in response to a concurrence of the collision signal and the vehicle speed signal being higher than the predetermined value.

12. An airbag restraint system as claimed in claim 11, wherein said second fixing means includes a lock pin which is engagable with the lock hole of said latch member upon said airbag unit moving forward of the vehicle under the reaction.

13. An airbag restraint system as claimed in claim 9, wherein said support casing is generally cylindrical to have a cylindrical wall, and wherein said airbag unit includes a generally cylindrical casing in which said airbag and said inflators are disposed, said casing having a cylindrical wall which is slidably fitted in said support casing cylindrical wall.

14. An airbag restraint system as claimed in claim 13, wherein said casing has an open end section though which said airbag projects into the passenger compartment, wherein said lid is fixedly secured to said casing open end section to fill said instrument panel opening when said airbag unit is at the first position.

* * * * *